United States Patent [19]

Soffiantini

[11] Patent Number: 4,739,953

[45] Date of Patent: Apr. 26, 1988

[54] SEAT WITH PROTECTING SHELL, IN PARTICULAR FOR TRANSPORT MEANS

[76] Inventor: Onorato Soffiantini, Via Marzorati 71G, Varese, Italy

[21] Appl. No.: 10,730

[22] Filed: Feb. 4, 1987

[30] Foreign Application Priority Data

Feb. 17, 1986 [IT] Italy .................... 19425 A/86

[51] Int. Cl.⁴ .................................. B64D 25/12
[52] U.S. Cl. ............................ 244/121; 244/122 R; 244/122 AG; 244/141
[58] Field of Search ............... 244/122 A, 141, 138 R, 244/140, 122 AG

[56] References Cited

U.S. PATENT DOCUMENTS

| | | |
|---|---|---|
| 2,699,305 | 1/1955 | Turner et al. .................... 244/141 |
| 2,733,027 | 1/1956 | Gero .................................. 244/140 |
| 2,806,666 | 9/1957 | Brown et al. ..................... 244/140 |
| 2,853,258 | 9/1958 | Polleys ............................. 244/140 |
| 2,984,211 | 5/1961 | Schnieder ........................ 244/140 |
| 2,986,361 | 5/1961 | Codding ........................... 244/140 |
| 3,123,326 | 3/1964 | Kenyon ........................ 244/122 AG |

Primary Examiner—Galen Barefoot
Attorney, Agent, or Firm—Oblon, Fisher, Spivak, McClelland & Maier

[57] ABSTRACT

Seat with protecting shell, fastened to a floor contained inside two hinged hollow hemispheres, suitable to close onto each other, provided with a back constituted by articulated segments. The seat is furthermore equipped with safety devices housed within special hollows provided inside the same shell.

4 Claims, 7 Drawing Sheets

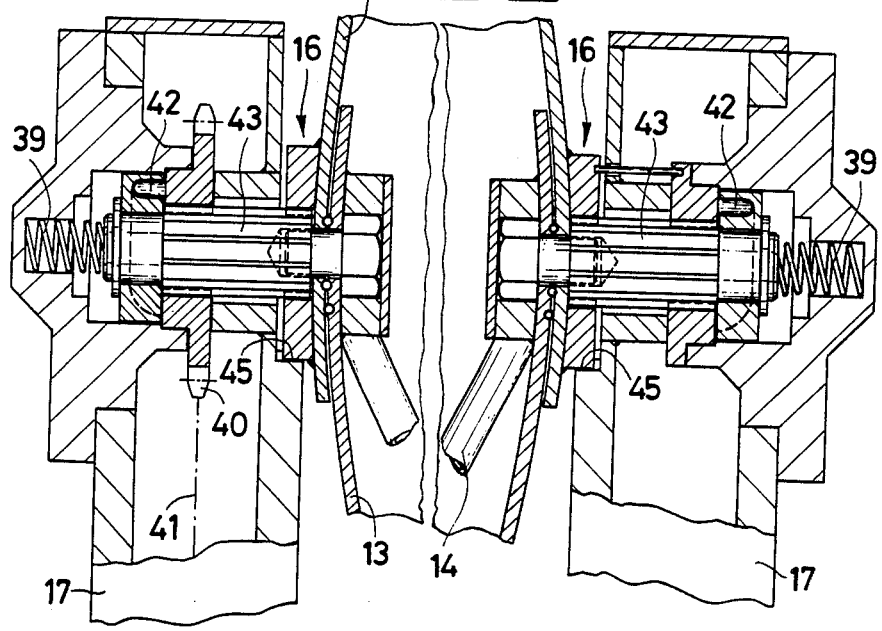
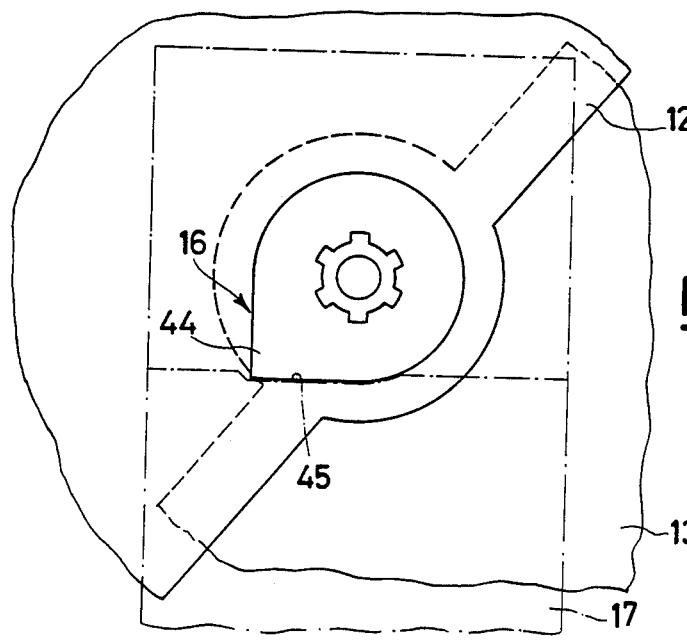

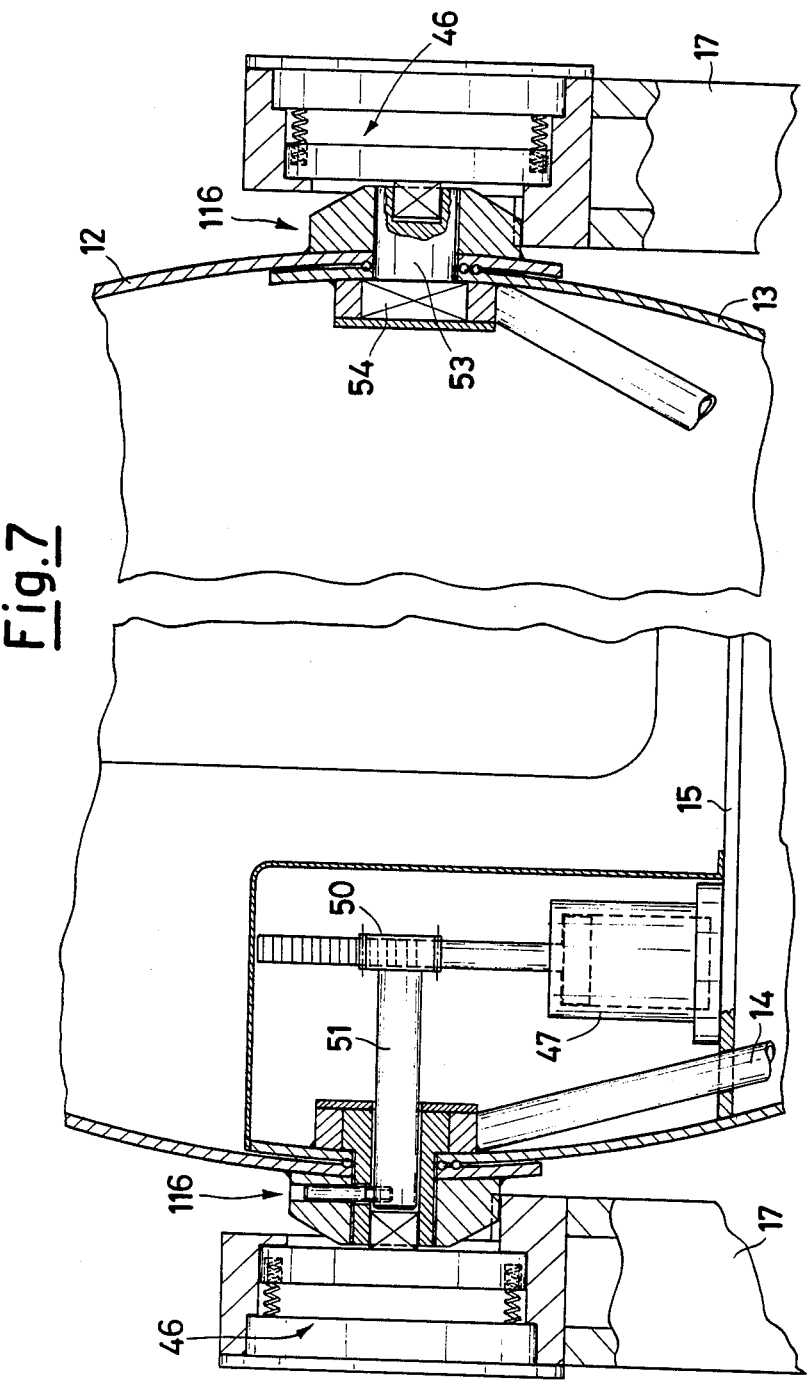

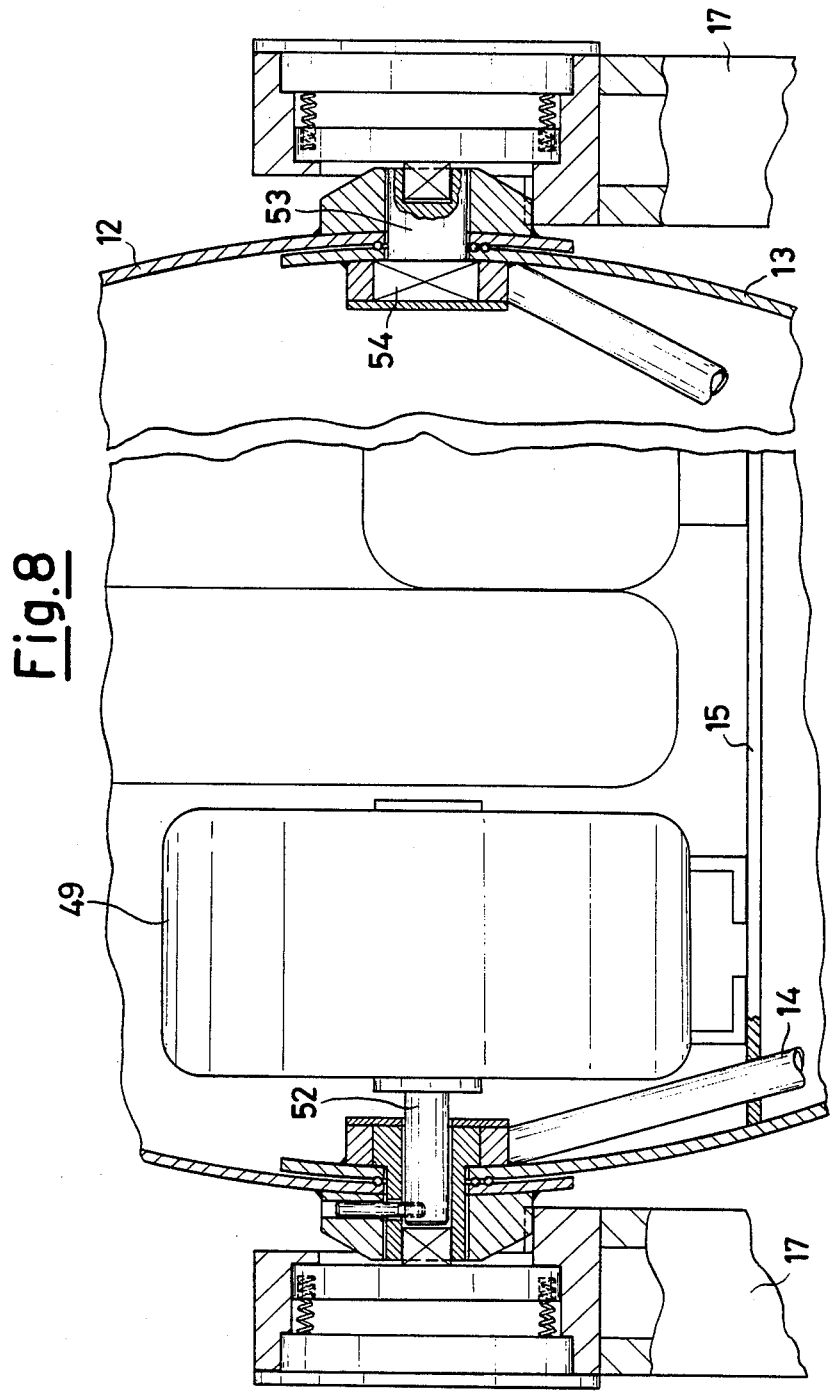

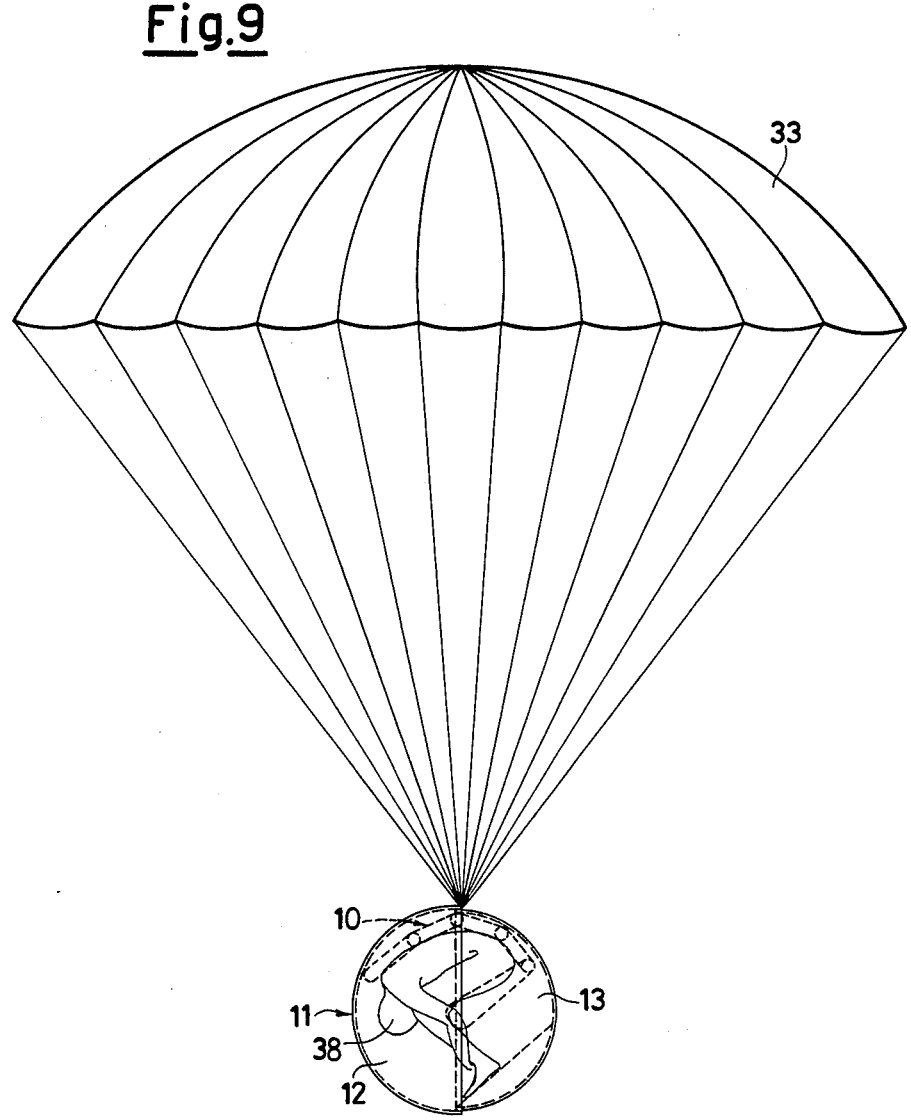

4,739,953

SEAT WITH PROTECTING SHELL, IN PARTICULAR FOR TRANSPORT MEANS

FIELD OF THE INVENTION

The present invention relates to a seat provided with protective shell, in particular for transport means.

BACKGROUND OF THE INVENTION

As is well-known, at present, such transport means as, e.g., the aircrafts for passenger carriage are equipped with seats of various sizes, of reclining type, and rigidly fastened onto a floor.

Such types of seats are not provided, apart from safety belts, with devices which may secure that a passenger occupying them, does not suffer damages in case of an accident.

The damages which, in this case, may occur to the passenger, may derive, besides from the impact, from smoke, flames, furthermore always in case of aircrafts, to date none of the passengers is equipped with parachute with the obvious danger therefrom arising in case of in-flight accident.

OBJECT OF THE INVENTION

A purpose of the present invention is to provide a safety seat which, besides obviating the above disadvantages, allows, at the same time, a comfortable position for the passenger who occupies it.

A further purpose of the present invention is that the seat should be adaptable to any types of transport vehicle, both of air, sea or land type.

SUMMARY OF THE INVENTION

In view of such purposes, a seat with a protective shell has been provided according to the instant invention, in particular for transport means, characterized in that it comprises at least one seat fastened onto a floor and a shell, constituted by two hinged hollow hemispheres, suitable to support the seat fastened onto the floor. The seat is provided with a back constituted by segments articulated relatively to each other, and the shell is provided with means for the tight closure of the hemispheres to constitute a spherical shell, as well as with safety and subsistence means.

BRIEF DESCRIPTION OF THE DRAWINGS

The present invention is now disclosed according to some preferred forms of practical embodiment with reference to the figures of the hereto attached tables, wherein:

FIG. 5 is a sectional view of a detail of a form of a practical embodiment of the shell closure and unhooking device;

FIG. 6 is a view of a detail of shell elements connecting hinge;

FIG. 7 is a sectional view of another form of a practical embodiment of the shell closure device;

FIG. 8 is a view of a further form of a practical embodiment of the shell closure device; and FIG. 9 is a view of the seat-containing shell, closed and hanging from a parachute.

DETAILED DESCRIPTION OF THE PRESENTLY PREFERRED EMBODIMENTS

Figure 1:
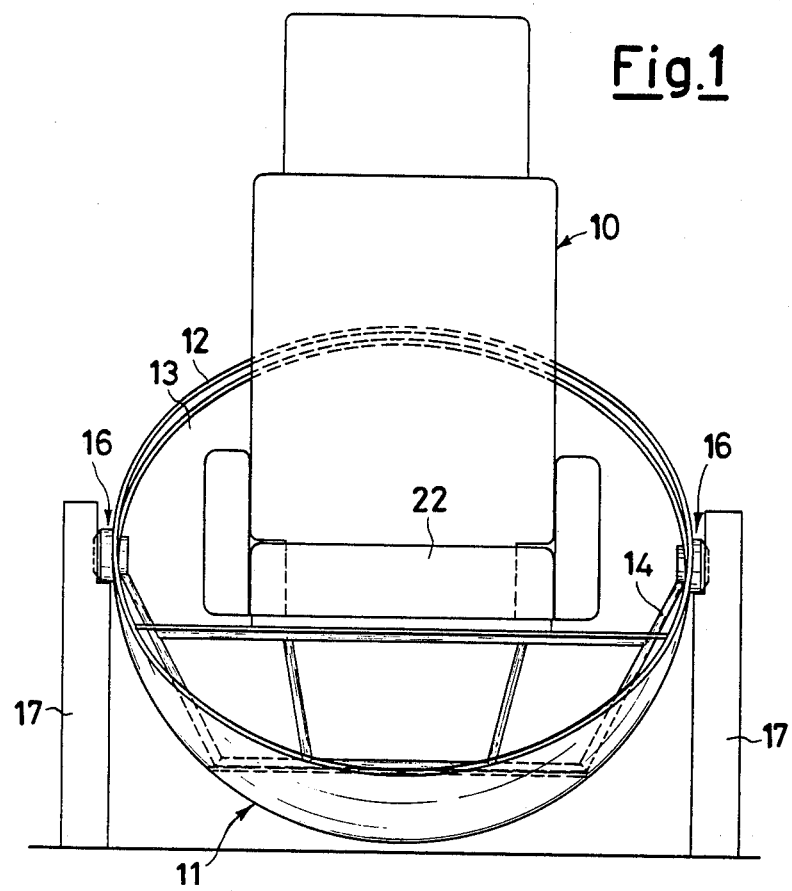
FIG. 1 is a partly sectional front view of the seat according to the invention, with the back thereof being in its upright position and the two hemishells being open.
Figure 2:
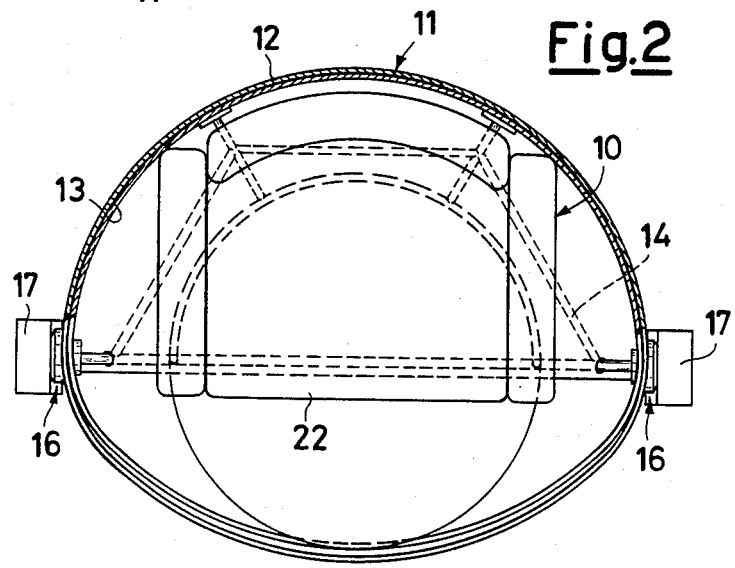
FIG. 2 is a partly sectional plan view of the seat of FIG. 1, with the back thereof being in curled up position, and the two hemishells being closed.

Referring to the figures, 10 is a seat according to the present invention is. The seat 10 is housed, by means of a frame 14, inside a shell generally indicated with 11, and constituted by two hollow hemispheres 12 and 13. The frame 14, which supports the seat 10, is fastened onto a floor 15, lying under it, and to the shell 11 in correspondence of hinges generally indicated with 16.

The hinges 16 are supported by shoulders 17. As it can be observed fron FIG. 4, the seat 10 has a seat constituted by four segments 18, 19, 20, 21. The segment 18, which we denominate as the top segment, has a free end and an end hinged onto the segment 19 by a first hinge 24. The segment 19 is linked, in its turn, by a second hinge 25, to the segment 20, which is in its turn hinged onto the segment 21 by means of a third hinge 26. The segment 21, at end opposite to the end bearing the third hinge 26 constituting the link with the segment 20 is hinged onto the horizontal part 22 of the seat 10, by means of a fourth hinge 27.

The horizontal part 22 of the seat is slidingly mounted on coaxial telescopic guides 23, which allow it to move forwards, at the same time allowing the seat back, formed by the segments 18, 19, 20, 21 to be reclined, up to a half-lying position. According to a preferred form of practical embodiment of the instant invention, the fourth hinge 27 allows the seat back to be reclined beyond its vertical position, whilst the first, the second, and the third hinge (24, 25 and 26) are provided with such suitable means as to allow that the respective segments 18, 19, and 20 remain lined up with one another and with the axis of the segment 21. Actuation controls 28 and 29 are provided on an arm 30 of the seat 10, for actuating safety means (disclosed hereinunder) and for the respective positioning of the seat back and of the horizontal part 22 thereof. Beneath the seat horizontal part 22, a cylinder 31 is provided and is suitable to secure the supply of a suitable mixture breathable by the passenger, and a device 32 for the expulsion of a parachute 33 is provided as well. The expulsion results possible when the two hemispheres 12 and 13 are tightly closed on each other, to form the protective shell of the seat 10, so to allow the opening in the a hatch 34 of hemisphere 13. It should be observed that both the parachute 33 and the expulsion device 32 are contained inside a chamber 35 separated by a tight sealing from the remainder of the shell 11.

Furthermore, always according to this form of practical embodiment, the parachute 33 is hooked to a sliding guide 36 which, from the interior of the chamber 35, extends outwards on a portion of the hemisphere 13, whilst in a portion beneath the floor 15 a battery 37 is provided.

Figure 3:
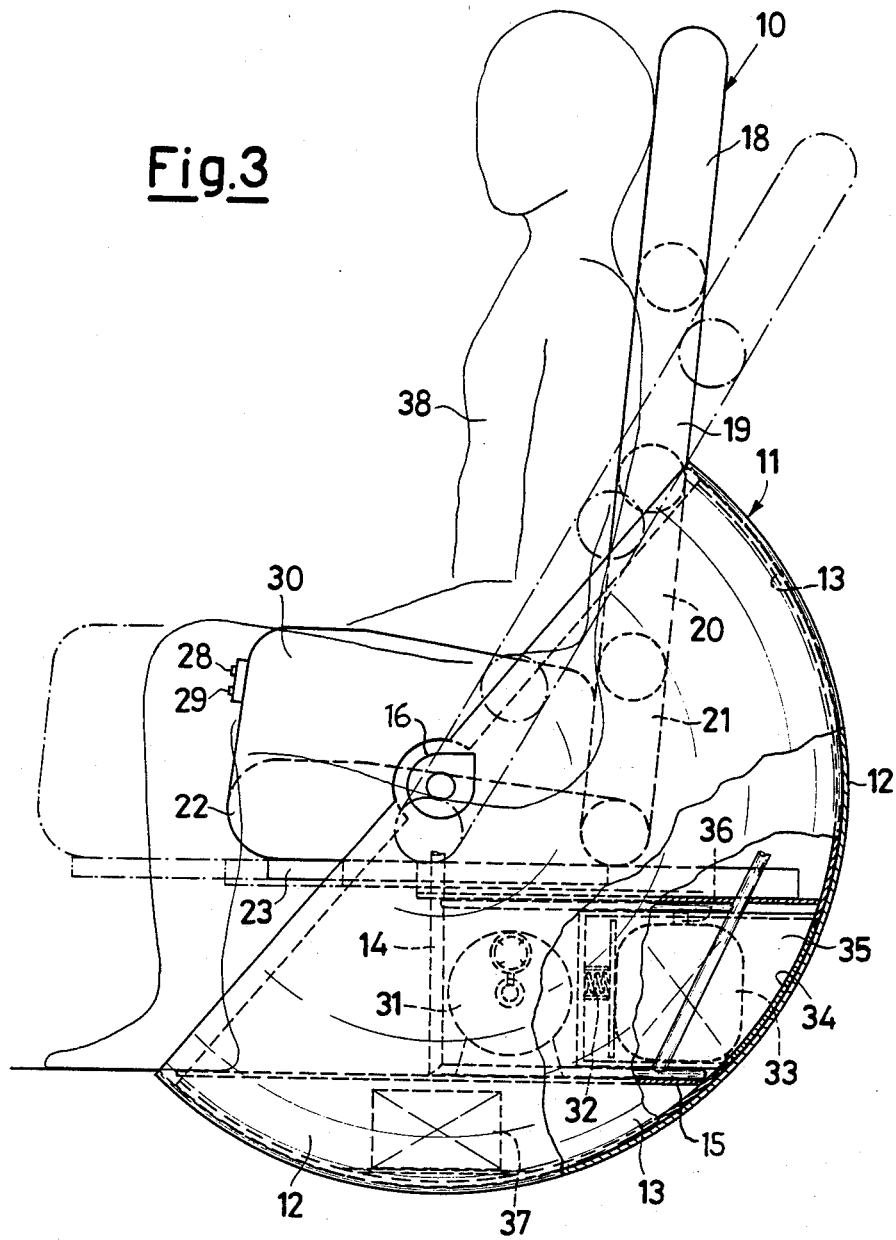
FIG. 3 is a partly sectional side view of the seat, of the hemishells and of the safety devices, with the back and the horizontal part thereof being shown in different positions.

As it can be observed in FIG. 3, a dummy 38 is shown, which is in its upright position, seated on the seat 10, with the two hemispheres 12 and 13 being open.

Figure 4:
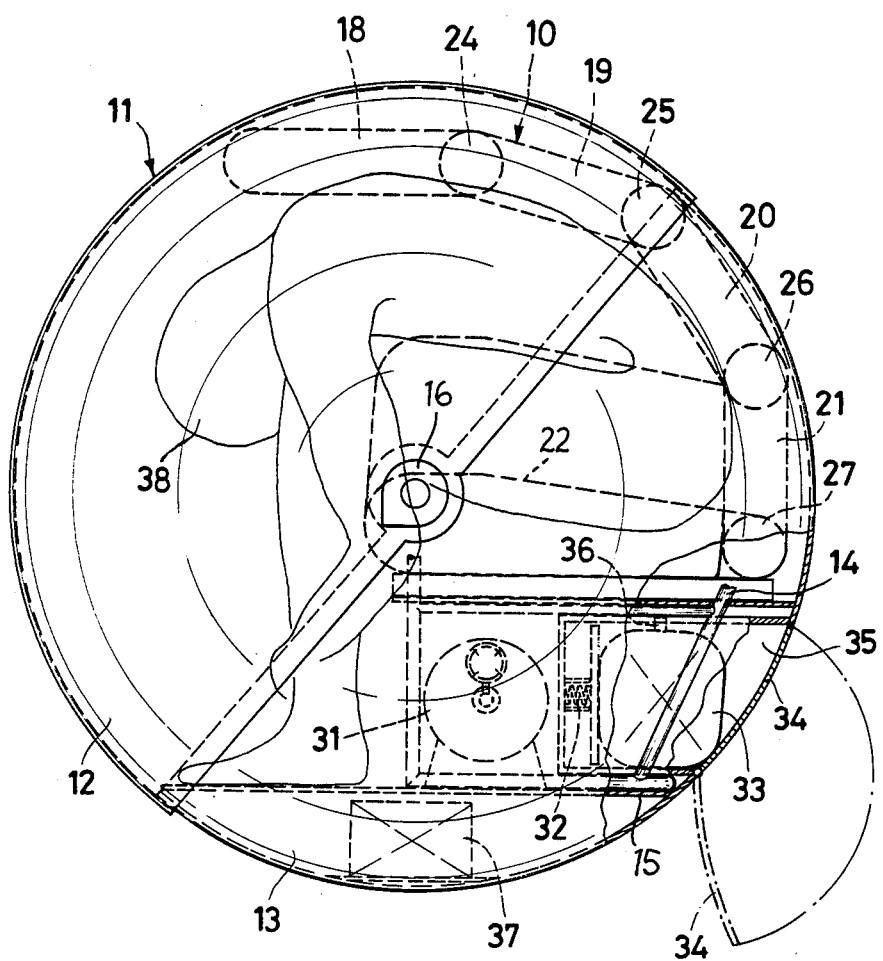
FIG. 4 is a partly sectional side view of the elements of FIG. 3, with the hemishells being closed and the seat back being in its curled up position.

FIG. 4 shows the two hemispheres 12 and 13 closed, with the dummy 38 being in its curled up position, and with the segments 18, 19, 20, and 21 of the back of the seat 10 being folded on the dummy 38.

Furthermore, in FIG. 4, the hatch 34 can be seen in its open position, to allow the parachute 33 to exit. In FIG. 9, the shell 11 (the two hollow hemispheres 12 and 13 being closed) is shown from the open parachute 33. The sectional view allows the positions which are taken by dummy 38 and by the seat back to be schematically shown.

The shell 11 constituted by the two hemispheres 12 and 13 is removably constrained onto the shoulders 17 in such a way that, in an emergency, with the two hemispheres 12 and 13 being in their closed position, the shell 11 can be unhooked from the shoulders 17 by means of a spring device 39 (see FIG. 5) provided according to a form of practical embodiment of the present invention.

Always according to this form of practical embodiment, in the shoulder 17 is contained a sprocket wheel 40, driven by a chain schematically shown at 41. The sprocket wheel 40, provided with a lock pin 42, drives a hub 43 linked to the hinge 16.

The hinge 16, thanks to its particular shape, shown in the detail of FIG. 6, allows the hemisphere 12 to rotate until the shell 11 is tightly closed, in such a way that a portion 44 of the hinge 16 comes to rest against a stop 45, the two hemispheres 12 and 13 coming thus to match for the tight closure of the shell 11.

The spring device 39, by freeing the lock pin 42, allows the shell 11, closed, and with the folded seat inside it, to unhook from the shoulders 17 and thus to be possibly parachuted.

According to another form of practical embodiment of the instant invention, the unhooking mechanism can be accomplished by means of an electromagnetic device 46 (FIG. 7) which, during the unhooking step, disengages a hinge 116 which performs a function analogous to that of the hinge 16. The electromagnetic device 16 is driven by a pneumatic device 47 fastened onto the floor 15 inside the shell 11.

In a further form of practical embodiment of the present invention (FIG. 8), the device which drives the closure of the two hemispheres 12 and 13 can advantageously be an electrical motor 49 fastened onto the floor 15. In the case of the pneumatic device 47, a gear 50 is preferably provided from which a shaft 51 protrudes. The shaft 51 drives the hinge 116 to close the two hemispheres 12 and 13. In the case of the electrical motor 49, the electrical motor 49 can advantageously be directly linked to the hinge 116 by means of a direct shaft 52.

On the opposite side of the seat 10 (relative to the side wherein the above-described mechanisms for the closure of the two hemispheres 12 and 13 and for the unhooking from the shoulders 17 of the closed shell 11 are provided) provided are the unhooking mechanisms only. On this side, hubs 53 are free to rotate on respective bearings 54.

Advantageously, also in the first disclosed form of practical embodiment, the devices for the shell 11 closure are provided in correspondence of one of the shoulders 17 only.

One will easily understand how a seat of the disclosed type can be suitable to any types of both land and sea, as well as air transport, vehicle.

In particular, as regards the air vehicles, it allows a passenger to be protected from possible fires, impacts, and from smoke. At the same time, once the shell 11 has been closed and unhooked from shoulders 17, it allows the passenger to be parachuted.

Advantageously, always according to the invention, the controls for the closure of the two hemispheres 12 and 13 and for the actuation of therein contained safety devices (31, 33 and 37) and unhooking devices can be directly actuated by the occupant of the seat 10, by means of the actuation control 29 provided on the arm 30, or by means of a remote command, e.g., from a driver's cab, a pilot's bridge, or a cockpit.

Furthermore, the two hemispheres 12 and 13 may be made from different materials, such as, e.g., light alloys, carbon fibres, or non-flammable plastic alloys.

Furthermore, always according to the basic technical teachings of the present invention, the hubs 43 and 53 can be structured in such a way that, by means of a manual unhooking device, they may release the two hemispheres 12 and 13 from the hinge constraint which links them, allowing the seat 10 occupier to open the hemispheres 12 and 13 by simply lifting the seat back up to the upright position.

The present invention has been disclosed according to preferred forms of practical embodiment thereof, with reference to the hereto attached drawings, but it should be understood that modifications and changes may be supplied by those skilled in the art, without going out of the protection scope of the present patent.

I claim:

1. A seating module comprising:
   (a) a first rigid hemispherical shell portion;
   (b) a second rigid hemispherical shell portion sized and shaped to be received within said first rigid hemispherical shell portion in concentric and at least substantially surface-to-surface contact relationship therewith;
   (c) a first hinge about which said first rigid hemispherical shell portion is pivotable relative to said second rigid hemispherical shell portion from a first position in which said second rigid hemispherical shell portion is received within said first rigid hemispherical shell portion to a second position in which said first and second rigid hemispherical shell portions form a closed, rigid, spherical shell;
   (d) first means for preventing inadvertent pivotal movement of said first rigid hemispherical shell portion from its first position to its second position;
   (e) second means for pivoting said first rigid hemispherical shell portion from its first position to its second position after release of said first means; and
   (f) a seat mounted inside said second rigid hemispherical shell portion, said seat comprising:
     (i) a normally at least approximately horizontal part which, in use, supports the buttocks of the occupant of the seat and
     (ii) a normally at least approximately vertical part which, in use, supports the back of the occupant of the seat, said normally at least approximately vertical part comprising a plurality of segments that are hinged to each other about a plurality of second hinges each of which is at least substantially parallel to said first hinge, said normally at least approximately vertical part being sized, shaped, and positioned so that said normally at least approximately vertical part extends out of said second rigid hemispherical shell portion when said first rigid hemispherical shell portion is in its first position and so that pivotal movement of said first rigid hemispherical shell portion about said first hinge from its first position to its second position causes one of said first and second rigid hemispherical shell portions to bear against said normally at least approximately vertical part, thereby causing said normally at least approximately vertical part to fold towards said normally at least approximately horizontal part about said second hinges.

2. A seating module as recited in claim 1 wherein:
(a) said seat is mounted for sliding movement in said second rigid hemispherical shell portion and
(b) movement of said seat towards said second rigid hemispherical shell portion causes said normally at least approximately vertical part to bear against one of said first and said rigid hemispherical shell portions, which in turn causes said normally at least approximately vertical part to fold toward said normally at least approximately horizontal part about said second hinges.

3. A seating module as recited in claim 1 and further comprising:
(a) a parachute disposed inside said second rigid hemispherical shell portion and
(b) third means for deploying said parachute after said first and second hemispherical shell portions have formed a closed, rigid, spherical shell.

4. A seating module as recited in claim 1 and further comprising an air cylinder disposed in said second rigid hemispherical shell portion.

* * * * *